US007598900B2

(12) United States Patent
Iverson (10) Patent No.: US 7,598,900 B2
(45) Date of Patent: Oct. 6, 2009

(54) MULTI-SPOT INVERSE SYNTHETIC APERTURE RADAR IMAGING

(75) Inventor: Derek E. Iverson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/937,545

(22) Filed: Nov. 9, 2007

(65) Prior Publication Data

US 2009/0121926 A1      May 14, 2009

(51) Int. Cl.
*G01S 13/90* (2006.01)
*G01S 7/483* (2006.01)

(52) U.S. Cl. .................. 342/25 F; 342/25 R; 342/25 A; 342/118; 342/128; 342/130; 342/131; 342/132; 342/175; 342/192; 342/195; 342/196

(58) Field of Classification Search ...... 342/25 R–25 F, 342/118, 128–133, 175, 189–197; 375/130, 375/139; 356/4.09
See application file for complete search history.

(56) References Cited

U.S. PATENT DOCUMENTS

| 4,546,355 | A | * | 10/1985 | Boles | 342/25 C |
|---|---|---|---|---|---|
| 4,786,906 | A | * | 11/1988 | Krogager | 342/25 F |
| 5,053,772 | A | * | 10/1991 | Lamper et al. | 342/25 A |
| 5,130,714 | A | * | 7/1992 | Taylor | 342/132 |
| 5,184,133 | A | * | 2/1993 | Tsao | 342/25 F |
| 5,250,952 | A | * | 10/1993 | Roth | 342/25 F |
| 5,610,610 | A | * | 3/1997 | Hudson et al. | 342/25 F |
| 5,708,436 | A | * | 1/1998 | Loiz et al. | 342/25 A |
| 5,808,580 | A | * | 9/1998 | Andrews, Jr. | 342/189 |
| 5,850,202 | A | * | 12/1998 | Goodman et al. | 342/25 A |
| 5,982,319 | A | * | 11/1999 | Borden et al. | 342/25 A |
| 6,091,356 | A | * | 7/2000 | Sanders et al. | 342/132 |
| 6,255,981 | B1 | | 7/2001 | Samaniego | |
| 6,424,287 | B1 | * | 7/2002 | Doerry et al. | 342/25 R |
| 6,624,780 | B1 | * | 9/2003 | Fouts et al. | 342/25 R |
| 6,624,783 | B1 | * | 9/2003 | Rabideau | 342/195 |
| 6,987,560 | B2 | * | 1/2006 | Morgan et al. | 356/4.09 |
| 2004/0239549 | A1 | * | 12/2004 | Morgan et al. | 342/25 R |

OTHER PUBLICATIONS

D. Slater, "Inverse Synthetic Aperture Imaging Radar"; paper delivered at the Antenna Measurement Techniques Association Conference in 1985; Rancho Carmel, California, USA.*

(Continued)

*Primary Examiner*—Bernarr E Gregory
(74) *Attorney, Agent, or Firm*—Lee & Hayes, PLLC (57) ABSTRACT

Providing multi-spot inverse synthetic aperture radar (ISAR) imagery is disclosed. Embodiments of techniques in accordance with the present disclosure may advantageously improve multiple target discrimination, detection, identification, and tracking using ISAR imaging. In an embodiment, an inverse synthetic aperture radar (ISAR) method for producing multiple ISAR images from a single waveform includes transmitting a chirp signal into a dwell surveyed by the antenna beamwidth. Multiple dechirp reference signals may be generated to demodulate return signals from the dwell at multiple selected intervals within a pulse repetition interval (PRI) to create demodulated signals.

20 Claims, 4 Drawing Sheets

OTHER PUBLICATIONS

Choi et al., "Target Shifts Due to Modeling Assumptions in Inverse Synthectic Aperture Radar", IEEE Intl Conf on Acoustics, Speech and Signal Processing, 1994, pp. V161-V164.

Gibbins et al., "Ship Motion Estimation from ISAR Data", 5th Intl Symposium on Signal Processing and its Applications, Aug. 1999, 4 pg.

Haywood et al., "ISARLAB: A Radar Signal Processing Tool", IEEE Intl Conf on Acoustics, Speech and Signal Processing, 1994, pp. V177-V180.

Soumekh et al., "Automatic Target Detection in Dynamic Clutter from Incoherent ISAR Data", IEEE Intl Conf on Acoustics, Speech and Signal Processing, 1994, pgs. V169-V172.

Wang et al., "Imaging of MultTargets with ISAR Based on the Time-Frequency Distribution", ICASSP, 1994, pp. V173-V176.

Zhang et al., "Aspects of Radar Imaging Using Frequency-Stepped Chirp Signals", EURASIP Journal on Applied Signal Processing, 2006, pp. 1-8.

* cited by examiner

MULTI-SPOT INVERSE SYNTHETIC APERTURE RADAR IMAGING

TECHNICAL FIELD

The present disclosure teaches methods and systems for target detection, tracking, and identification, and more specifically, to methods and systems for providing multi-spot inverse synthetic aperture radar (ISAR) imaging.

BACKGROUND

Inverse Synthetic Aperture Radar (ISAR) is a technique used to generate two-dimensional resolutions (images) of an object or a target. Unlike many other radar techniques, ISAR may be used to identify a target by imaging descriptive attributes of the target, and therefore enable classification of the target (e.g., type of ship, aircraft, etc.). ISAR processing uses the rotational motion of the target object to extract image points after removing the relative mean motion between a sensor and an object.

Radars typically use some form of waveform modulation as a basis for pulse compression so that the average power of the sensor can be increased without degrading range resolution. Common forms of waveform modulation are binary phase modulation and linear frequency modulation or chirp.

Radars typically use stretch processing when utilizing chirp modulation in a high resolution sensor. Stretch processing performs a range to frequency mapping of the return signal so the range extent of the image space of the target can be translated into a frequency extent in the intermediate frequency (IF) portion of the radar receiver. This is physically accomplished by multiplying the received signal by a dechirp reference signal and then bandpass-filtering the resulting product. The mapping is controlled by the chirp rate and initiation time of the dechirp signal. Stretch processing is typically used for implementing the radar receiver with lower speed analog to digital converters (ADC's) in exchange for reduced range swath coverage. Azimuth swath coverage is controlled by the antenna beamwidth. Pulse compression is achieved by performing a fast Fourier transform (FFT) on the range samples.

Extending the range swath of a stretch type system typically involves increasing the length of the dechirp signal. Thus, this involves greatly expanding the linearity requirements of the dechirp generator and complicates receiver implementation. Increasing the resolution requires increased waveform bandwidth, which again stresses the chirp and dechirp generation implementations. Bandwidth increases can be achieved in stepwise fashion. Prior art includes the concept of transmitting a large bandwidth chirp signal, but using a piecewise dechirp (a 'sawtooth' or step chirp type waveform) and then recombining the dechirped segments to obtain the desired total bandwidth in the received signal.

Functionally, single ISAR images have been generated in the radar by positioning the pulse return sample interval at the desired range of the target. With a stretch type radar, this means positioning the dechirp reference signal at the correct range interval as well. The target is typically under track at the time of such imaging in order to remove the relative mean motion between sensor and target. The residual signal effects of rigid body rotational motion of the target can be used to separate out individual pixels in the ISAR image. Such images are typically used to assist in target classification.

SUMMARY

Methods and systems for providing multi-spot inverse synthetic aperture radar (ISAR) imagery are disclosed. Embodiments of techniques in accordance with the present disclosure may advantageously improve multiple target discrimination, detection, identification, and tracking using ISAR imaging.

In an embodiment, a method of operating an inverse synthetic aperture radar (ISAR) includes transmitting a chirp signal into a dwell surveyed by the antenna beamwidth. Multiple dechirp reference signals may be generated for use to demodulate return signals from the dwell at multiple selected intervals within a pulse repetition interval (PRI).

In another embodiment, a system for producing multi-spot inverse synthetic aperture radar images from a single waveform without changing the chirp waveform or intermediate frequency bandwidth in the receiver includes a receiver-exciter component for generating a transmit chirp and a plurality of copies of a dechirp reference signal with each pulse repetition interval, the dechirp signals associated with return signals from the transmit chirp. A plurality of receivers may be included for independently receiving the return signals in an interval and performing stretch processing utilizing the dechirp reference signal. In addition, the system may include a digitizer for each of the plurality of receivers, the digitizer operating at a selected interval and capturing an intermediate signal bandwidth.

In yet another embodiment, one or more computer-readable media storing computer executable instructions that, when executed by one or more processors, perform acts including receiving return signals from a radar transmission, the return signals including information on multiple range intervals within a pulse repetition interval. The return signals may be dechirping using multiple dechirp reference signals. In addition, the dechirped return signals may be digitized. The digitized signals are associated for each range interval using a block of pulse returns for at least one of a detection process or an ISAR imaging process.

The features, functions, and advantages can be achieved independently in various embodiments of the present disclosure or may be combined in yet other embodiments.

BRIEF DESCRIPTION OF THE DRAWINGS

Embodiments of techniques in accordance with the present disclosure are described in detail below with reference to the following drawings.

DETAILED DESCRIPTION

Techniques for providing multi-spot Inverse Synthetic Aperture Radar (ISAR) are described herein. Many specific details of certain embodiments of the disclosure are set forth in the following description and in FIGS. 1 through 5 to provide a thorough understanding of such embodiments. One skilled in the art, however, will understand that the present disclosure may have additional embodiments, or that the present disclosure may be practiced without several of the details described in the following description.

Generally speaking, the multi-spot ISAR imaging techniques described herein enable the detection, identification, and tracking of multiple targets within a single radar beamwidth while minimizing system hardware costs. In addition, the techniques disclosed herein enable improved interleaved detection and discrimination capability that can be used with all antenna types but is especially useful to radars with mechanically scanned antennas (MSA).

Prior ISAR approaches have used a single dechirp generator and were limited to a single ISAR image per beam. Handling multiple separated targets in a single pulse repetition interval (PRI) with traditional ISAR processing techniques would typically necessitate a dechirp reference signal with a much wider bandwidth than the transmit signal, in order to handle the required increased range extent, which in turn stresses the hardware implementation. The techniques described herein for providing multi-spot ISAR imaging are not directed at decomposing a wide bandwidth as in step-frequency transform, but rather at preferentially sampling and independently processing desirable segments of the PRI.

Figure 1:
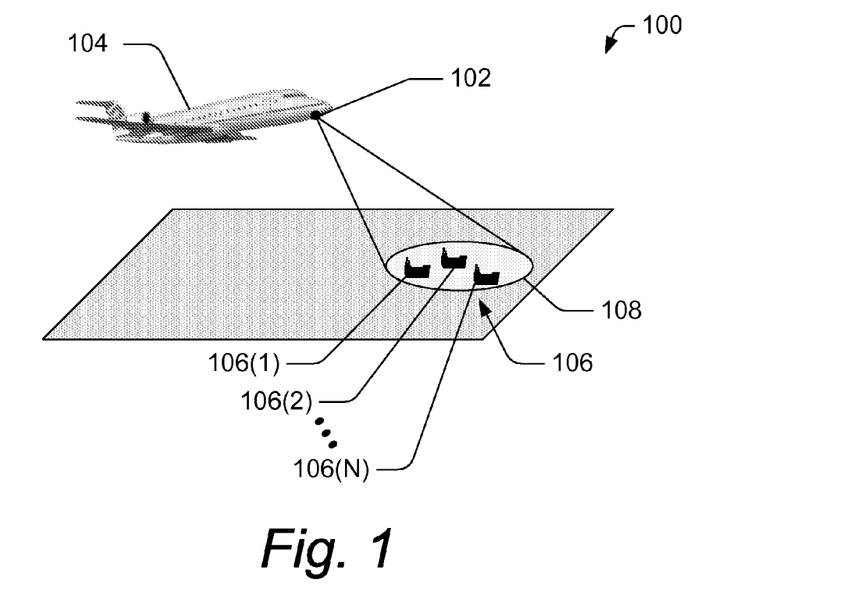
FIG. 1 is a schematic view of a radar apparatus that is observing a group of targets in the same beam position in accordance with an embodiment of the disclosure.

FIG. 1 is a schematic view of an environment where ISAR is used to detect targets within an arbitrarily chosen beamwidth of the radar antenna. As shown in FIG. 1, a radar 102 implementing ISAR is implemented on an aircraft 104 to detect multiple targets 106. In embodiments, the radar 102 may be stationary or configured with a movable vehicle, including without limitation aircraft and maritime vessels. For example, the radar 102 may be implemented in an unmanned aerial vehicle (UAV). The target set 106 includes any number of targets, such as targets 106(1), 106(2), ..., 106(N). The targets 106(1)-106(N) may be maritime vessels, with wave induced relative rotational motion. The targets may also include without limitation aircraft, artillery, missiles, structures, land or space vehicles, and the like if relative rotational motion exists to enable use of ISAR for image detection. A radar dwell 108 is created by a predetermined scanning operation of the radar 102 and defines the range of data collected by the radar. As implemented, only targets 106(1)-(N) included within the radar dwell 108 may be detected, identified, and tracked by the techniques described herein and applied to this particular radar dwell.

Multiple target identification and tracking has utility in many applications. For example, during search operations the radar 102 may detect and track a multiplicity of targets scattered over many dwells at a multiplicity of ranges. When a target is located, ISAR is used to image the target, such as the target 106(1) in FIG. 1. In order to maintain continuous track updating on targets in the surveillance area, limited time is available for performing imaging operations. In addition, the extra degree of information that is available in an ISAR image of each target is not available to assist in discriminating targets from the clutter and in maintaining track continuity.

Figure 2:
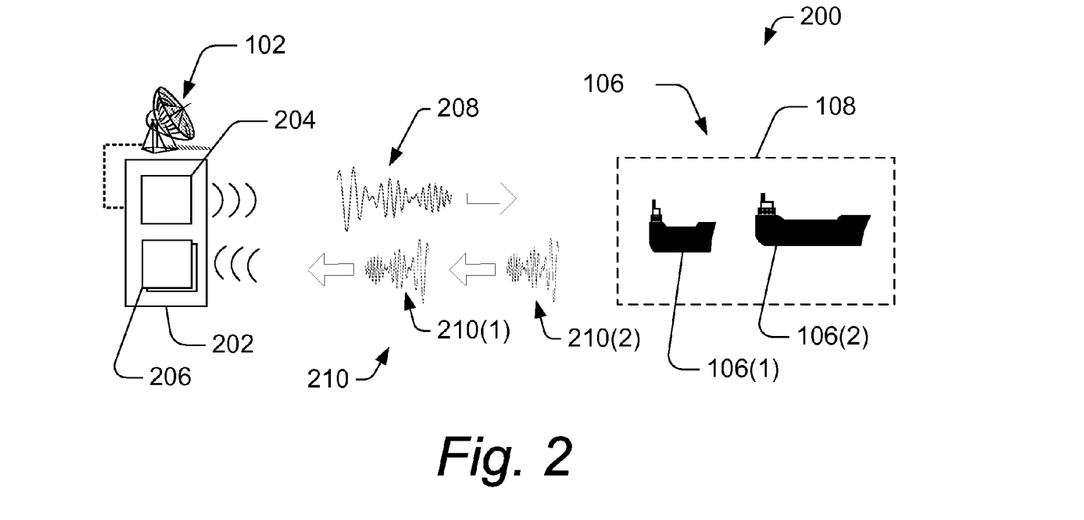
FIG. 2 is a schematic diagram of an environment where a chirp signal is transmitted toward multiple targets which produced multiple target return signals in accordance with another embodiment of the disclosure.

FIG. 2 is a schematic diagram of an environment 200 where a chirp signal is transmitted toward the target set 106 and deflected return signals are received from each target 106(1)-(N) in the target set 106. In some embodiments, the radar 102 is based on stretch processing and includes one or more dechirp reference generators. The dechirp reference generators may be efficiently implemented utilizing Direct Digital Synthesis (DDS), sharing hardware with the transmit chirp generator. A radar exciter component 202 of the radar 102 may include a signal generator 204 and one or more dechirp generators 206. The signal generator 204 creates a transmit chirp that is amplified and radiated as a transmit chirp 208 in the antenna beam position. This beam position is shown to encompass target group 106. The transmit chirp 208 is shown, for the purpose of simplicity, as being reflected by the targets 106(1), 106(2), whereby return signals 210(1) and 210(2) return to the radar 102. The return signals 210(1), 210(2) correspond to targets 106(1), 106(2), respectively, and enable the radar 102 to generate information related to the individual targets. The dechirp generator(s) 206, as implemented in the radar exciter component 202, creates a dechirp signal with same frequency extent and chirp rate as the transmit chirp 208 for each target's return signal 210 to create one or more dechirped signals. The dechirped signals are converted from an analog signal to a digital signal and stored for later processing, as described below.

Figure 3:
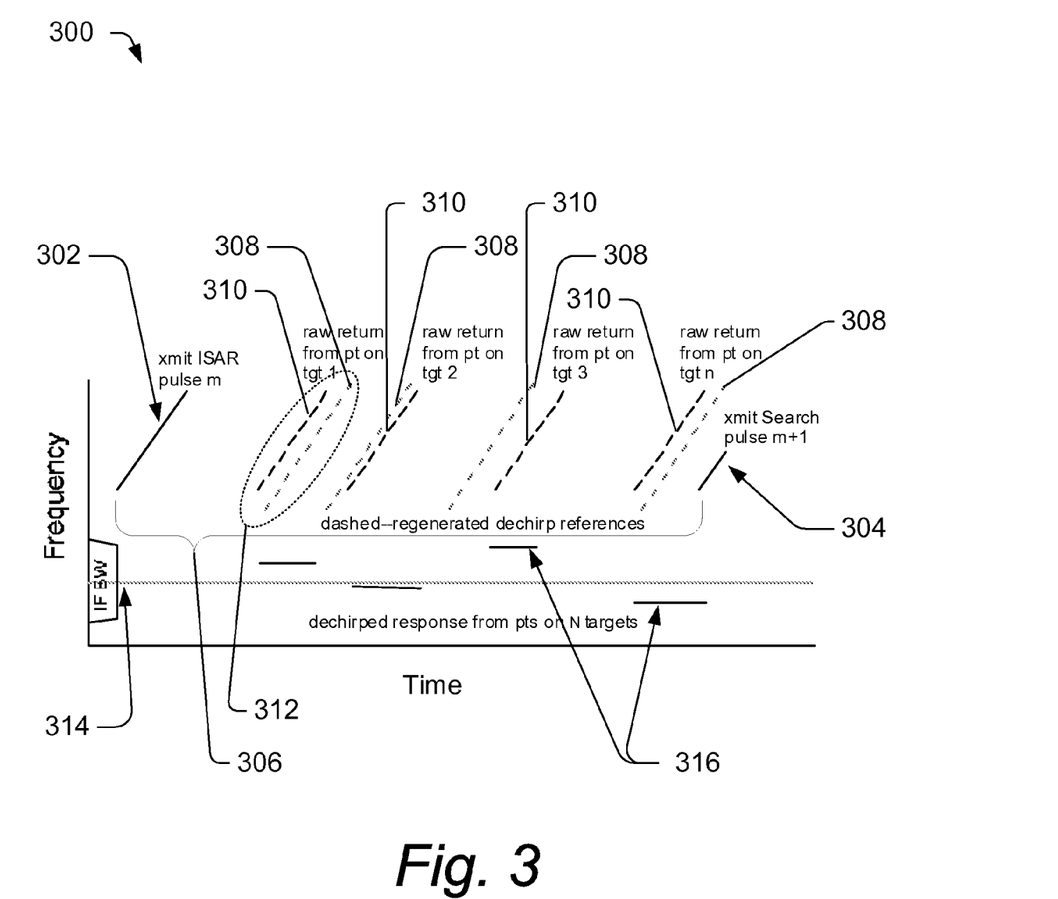
FIG. 3 is a time-frequency diagram view of an embodiment of the ISAR processing using a stretch implementation where the system is designed to provide multiple reference dechirp signals and multiple parallel receivers in accordance with an embodiment of the disclosure.

FIG. 3 is an illustrative chart 300 depicting a multi-spot pulse repetition interval (PRI) where multiple target returns are observed, each of which is deramped by an associated dechirp reference signal. The chart 300 includes a plot of signals where frequency is designated on the vertical axis and time is designated on the horizontal axis. This particular embodiment of the invention shows two interleaved waveforms, a wideband ISAR waveform 302 that is processed via stretch processing and a narrowband search waveform 304 that is to be pulse compressed without stretch processing. A first transmit chirp pulse for the first waveform, such as the wideband ISAR waveform 302, may be generated by the signal generator 204 followed by a second chirp pulse for the second waveform, such as the narrowband search waveform 304. A pulse repetition interval (PRI) 306 is defined as the time between the first chirp and the second chirp. A single chirp is generated for each PRI 306.

A dechirp reference signal 308 is generated by the dechirp generator 206 to demodulate a chirp signal 310, such as the first received chirp signal from a first target. As illustrated, FIG. 3 depicts four targets, each having a received return, although more or fewer targets may be monitored in other instances. The dechirp reference signal 308 is regenerated for a multiplicity of receive times. In FIG. 3, it is assumed that the times are arbitrarily spaced in the PRI 306, each associated to a particular target position. In another embodiments, the dechirp references may be implemented at sequential, regularly spaced range positions.

The PRI 306 is repeated for a number of cycles, where at each cycle of the ISAR waveform multiple digital dechirp signals are created for a desired interval. For example, if there are four such ISAR spots within the radar dwell 108, 64 PRI cycles would generate 256 total waveforms that are digitized and stored for further ISAR processing. Each group of data associated with a corresponding ISAR spot range interval is analyzed separately from the data corresponding to other such intervals. Thus, all the data for a first target is grouped together and processed by methods used for single target ISAR imagining. The returns from the interleaved search pulses, if used, is likewise grouped separately and used for target detection. Consistent with the example above there would be 64 pulses of low resolution returns that would be pulse compressed, digitized and saved for processing.

In one embodiment, the receiver implements the dechirp signal 308 using programmable digital synthesis techniques as part of a combined radar receiver-exciter function. Multiple dechirp segments, such as a dechirp segment 312, at programmable ranges (within the radar dwell 110) may be accommodated within the PRI 306 of the waveform. After stretch processing the resulting signal intervals are digitized. In embodiments, a number of samples (e.g., 1024 samples) may be collected in each range interval using the same hardware and bandwidth characteristics as used in traditional ISAR radar imaging systems. The blocks of samples are used for ISAR imaging for each target. Tracking of scattering centers for ISAR motion compensation may be accomplished independently on each block associated with a target, using digital interpolation and frequency shifting techniques. Traditional ISAR scatter image formation and tracking code may be used with minimal changes to accommodate the use of digital interpolation and frequency shifting techniques that assist in stably tracking an embedded target in time and frequency.

If two targets are located close together in a single processing interval, separation of the targets may be aided by offsetting but overlapping two adjacent processing intervals. The overlap would require an implementation with more than one stretch receiver. With only a single receiver, there will be some minimal time before another stretch interval can be started due to hardware limitations, and hence such overlapping of processing intervals will not be possible.

After the stretch processing, the dechirped signal returns appear in the intermediate frequency band (IFBW) 314. In FIG. 3, signals from points on the four target responses 310 appear as approximately constant frequency signals 316 in the IFBW 314. The frequency signals 316 are digitized over the applicable intervals where they exist, sorted by interval, and stored for further processing. A fast Fourier transform (FFT) in the range dimension of each of these intervals of a multi-spot return may be used to accomplish pulse compression.

Figure 4:
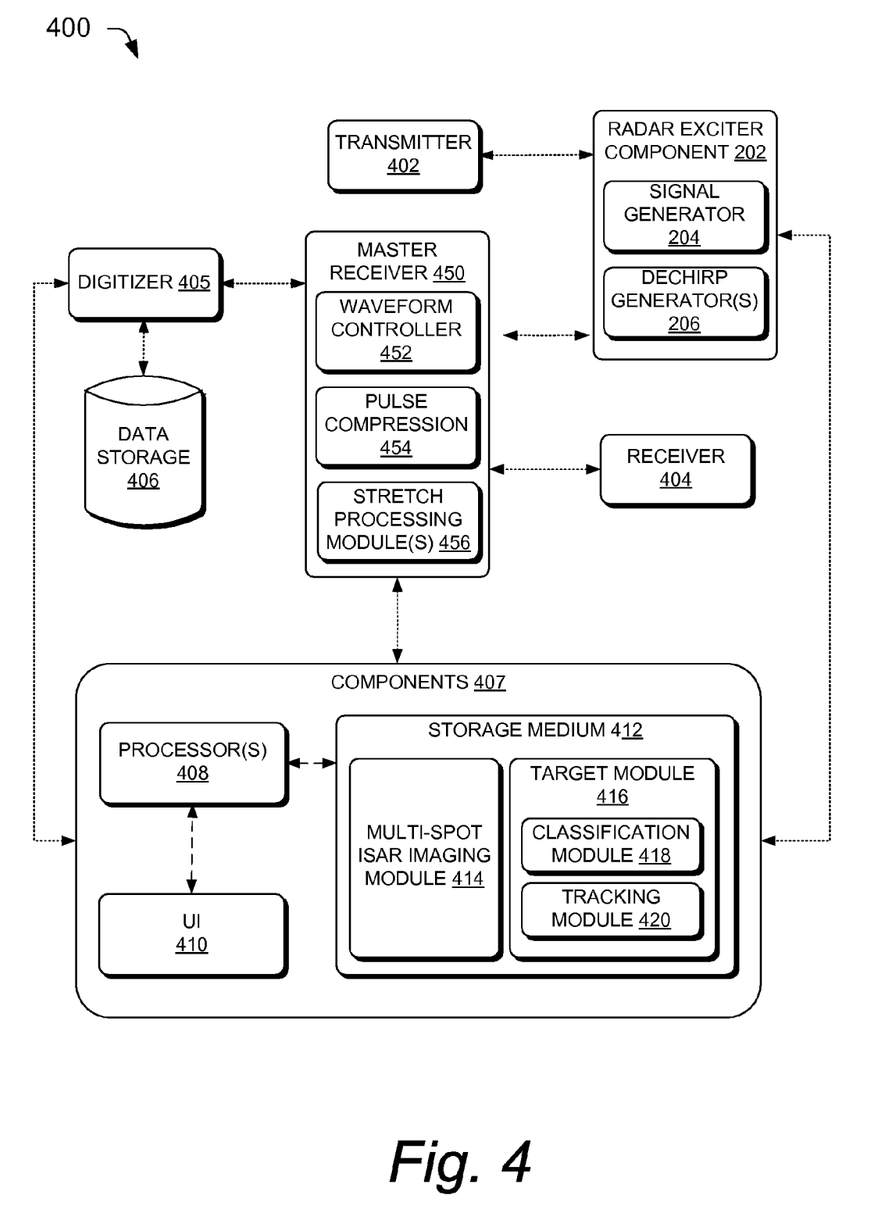
FIG. 4 is a block diagram of an illustrative computing architecture for providing multi-spot ISAR imaging in accordance with another embodiment of the disclosure.

FIG. 4 is a block diagram of an illustrative architecture 400 for providing multi-spot ISAR imaging in accordance with another embodiment of the disclosure. The architecture 400 includes the radar exciter component 202, the signal generator 204, and the dechirp generator(s) 206 as illustrated in FIG. 2. A transmitter 402 and a receiver 404 may be in communication with the radar exciter component 202 to facilitate transmission and receipt of signals as described herein.

The radar exciter component 202 is operationally coupled to a master receiver 450. The receiver includes a waveform controller 452, a pulse compression component 454, and a stretch processing module(s) 456. In embodiments, the waveform controller 452 synchronizes the operation of an exciter and the receiver. The pulse compression component 454 accomplishes pulse compression of the low resolution waveform, if utilized. The stretch processing module 456 accomplishes dechirp mixing and filtering operation prior to digitization. The master receiver 450 is coupled to a digitizer 405 and an optional data storage device 406 for storing data, such as the data corresponding to each received interval are properly digitized and stored for further processing.

The architecture 400 may include a number of components 407, including one or more processors 408 that are coupled to instances of a user interface (UT) 410. The architecture 400 may include one or more instances of a computer-readable storage medium 412 that are addressable by the processor 408. As such, the processor 408 may read data or executable instructions from, or store data to, the storage medium 412. The storage medium 412 may contain implementations of any software modules described herein.

The architecture 400 contains a multi-spot ISAR imaging module 414, which may be implemented as one or more software modules that, when loaded into the processor 408 and executed, cause the architecture 400 to perform any of the functions described herein, such as to generate multi-spot ISAR images for the target cluster 106. Additionally, the imaging module may contain the code to perform pulse compression on the stretched waveform data from 406, or to perform detection processing on the low resolution detection data, if an interleaved waveform is utilized. Additionally, the multi-spot imaging module 414 may contain the software necessary to automatically focus the ISAR image. This capability can include, for instance, the ability to track a single scattering center on a target so as to control range walk of the target through the sample interval. In this implementation such tracking might be performed with digital interpolation and frequency shifting techniques in the imaging module, or it might feed corrections in start time, start frequency, and chirp shape to the dechirp generator and make these corrections at the stretch processing stage.

The architecture 400 also includes a target module 416. The target module 416 may include functional modules such as a classification module 418 and a tracking module 420. The classification module 418 may be implemented at various levels of complexity. At a simple level of complexity, the classification module 418 may be a blob detector and discriminate probable targets from a clutter. At a more complex level, the classification module 418 may be a maximum likelihood template matching module that is used to compare ISAR images to templates in a database. Further, the classification module 418 may be used to discriminate targets from the clutter, to create new templates based on a target under track, or to cue an operator as to the database targets that most closely match an observed image. Real time template creation may be used to help with target association and correlation problems in the tracker, as well as provide a means to accomplish target change detection, such as detecting when a cargo offload has occurred.

The tracking module 420 can also be implemented at various levels of complexity. For example, the tracking module 420 may track only the low resolution search responses using blob detection and a simple Kalman Filter. Alternatively or in addition, the tracking module 420 may be a multiple model, multiple hypothesis tracker implementation that may use data from both a low resolution search waveform as well as an ISAR imaging waveform.

Figure 5:
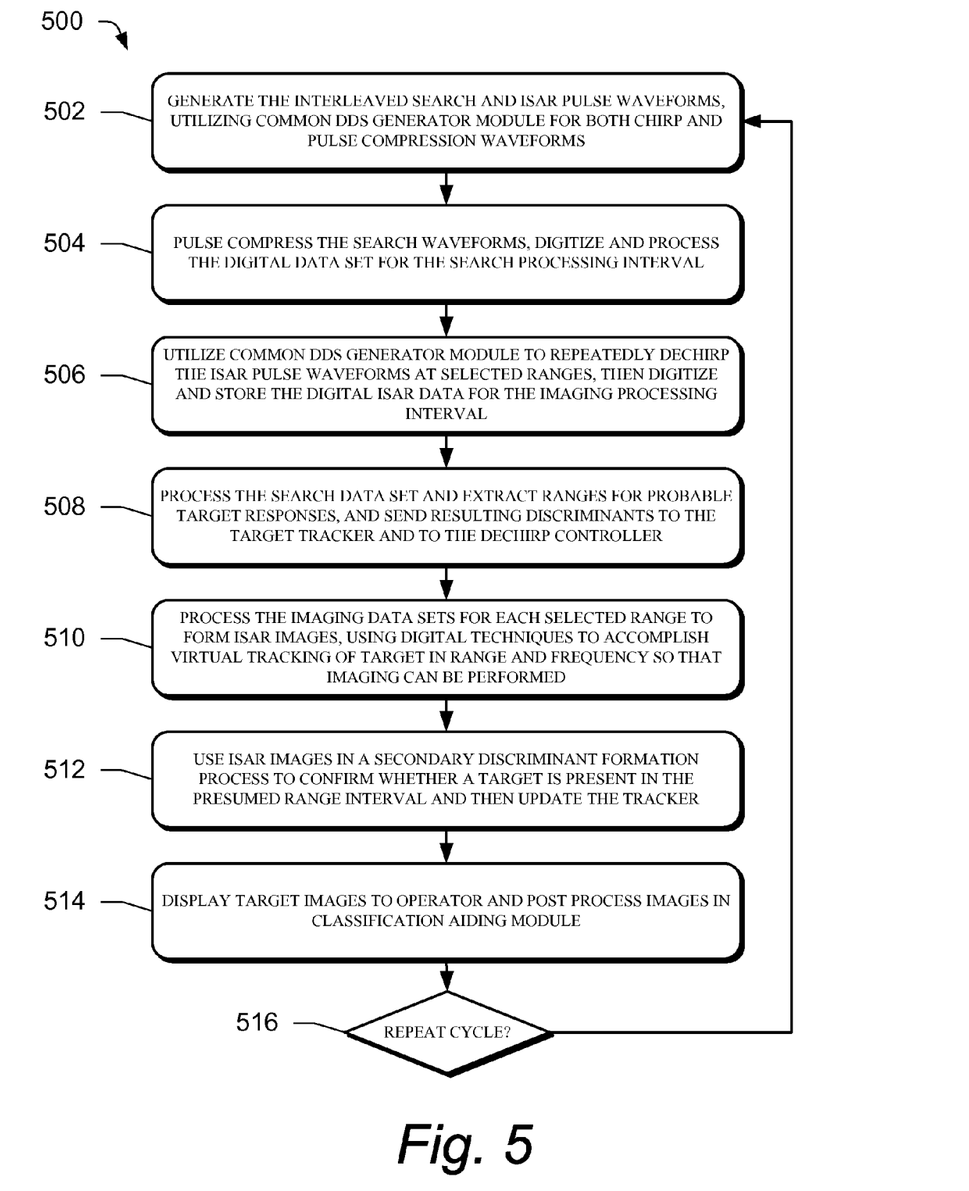
FIG. 5 is a flow diagram of an illustrative process for providing multi-spot ISAR imaging in accordance with yet another embodiment of the disclosure.

FIG. 5 is a flow diagram of an illustrative process 500 for providing multi-spot ISAR imaging in accordance with yet another embodiment of the disclosure. The process 500 includes a number of operations. The organization of the operations is not intended as a limitation. In other embodiments, the operations may be performed in series or parallel. As described below, the illustrative process 500 is presented in one of many possible configurations.

The process 500 begins at a block 502 where the process may generate the interleaved search and ISAR pulse waveforms, utilizing common Direct Digital Synthesis (DDS) generator module for both chirp and pulse compression waveforms. At a block 504, the process may pulse compress the search waveforms, digitize and process the digital data set for the search processing interval. At a block 506, the process may utilize common DDS generator module to repeatedly dechirp the ISAR pulse waveforms at selected ranges, and then digitize and store the digital ISAR data for the imaging processing interval. At a block 508, the process may transform the search data set and extract ranges for probable target responses, and send resulting discriminants to the target tracker and to the dechirp controller.

At a block 510, the process may transform the imaging data sets for each selected range to form ISAR images, using digital techniques to accomplish virtual tracking of target in range and frequency so that imaging can be performed. At a block 512, the process may use ISAR images in a secondary discriminant formation process to confirm whether a target is present in the presumed range interval and then update the tracker. At a block 514, the process may cause the display of target images to an operator and post process images in classification aiding module. The process may be repeated at a decision block 516, and thus return to the block 502 for another cycle.

Implementations of multi-spot ISAR imaging may greatly expand the utility of mechanically scanned antennas (MSA) and expand use of ISAR imaging, negating some of the interleaved mode capability that creates demand for electronically scanned antennas (ESA). In an example implementation, a high altitude surface search capability may be implemented by using a 30 meter resolution, side-looking, DBS or Strip-SAR (synthetic aperture radar) mode with an auto-detect capability, in combination with an interleaved 1 m resolution ISAR waveform. Such a detection waveform has minimal target range gate straddle up to target speeds of 20 knots. During the time it takes an aircraft traveling at 300 knots to fly half a beamwidth, there is sufficient time to accomplish both coherent detection via the search waveform and to collect the data for a multi-spot ISAR from the imaging waveform. The processing intervals for detection and imaging may be staggered so that the detection results feed the selection of multi-spot ISAR processing intervals. ISAR processing in turn can be used to confirm detections made in the search mode and discriminate against clutter; to refine the track error signal; to help with association and correlation of targets in a dense target environment; and provide classification aiding and target change detection for the operator. In an additional embodiment, a search function may be generated by auto-generating dechirp signals at a sequence of equally spaced ranges, similar to step transform filtering except that individual steps are not combined to produce wider bandwidth and the imaging function is ISAR rather than SAR.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method of operating an inverse synthetic aperture radar (ISAR), the method comprising:
    transmitting a chirp signal into a dwell surveyed by the antenna beamwidth; and
    generating multiple dechirp reference signals for use to demodulate return signals from the dwell at multiple selected intervals within a pulse repetition interval (PRI).

2. The method of claim 1, further comprising determining an initial location of a target and controlling a placement of the digitizer sampling so that the target is placed in an ISAR processing interval.

3. The method of claim 1, wherein generating multiple dechirp reference signals further includes generating multiple digitalization intervals for each PRI.

4. The method of claim 1, wherein the method is implemented in a radar system configured in an aircraft for maritime vessel detection.

5. The method of claim 1, wherein pulse interleaving is used to both transmit a low resolution signal to detect an object and as a high resolution signal to image the object during the same composite waveform.

6. The method of claim 1, further comprising digitizating multiple intervals associated with a stretch processing in an intermediate frequency bandwidth for each PRI.

7. A system for producing multi-spot inverse synthetic aperture radar (ISAR) images from a single waveform without changing the chirp waveform or intermediate frequency bandwidth in the receiver, comprising:
    a receiver-exciter component for generating a transmit chirp and a plurality of copies of a dechirp reference signal with each pulse repetition interval (PRI), the dechirp signals associated with return signals from the transmit chirp;
    a plurality of receivers for independently receiving the return signals in an interval and performing stretch processing utilizing the dechirp reference signal; and
    a digitizer for each of the plurality of receivers, the digitizer operating at a selected interval and capturing an intermediate signal bandwidth.

8. The system of claim 7, wherein the plurality of receivers include two or more receivers including stretch processors configured for processing overlapped intervals.

9. The system of claim 7, wherein the composite waveform comprises two interleaved pulse waveforms including a first waveform having a lower resolution and configured for detection and a second waveform having a higher resolution and configured for ISAR imaging.

10. The system of claim 7, further comprising a multi-spot ISAR imaging module for processing digital data corresponding to multiple selected range intervals received from the ISAR waveform, the range intervals are at least one of selected discretely from a prior detect function or implemented sequentially to accomplish a search function.

11. The system of claim 7, further comprising a target tracking module for utilizing a response from at least one of a low resolution response or a higher resolution ISAR response to a tracking of a plurality of targets.

12. The system of claim 7, wherein the system is implemented in a radar system configured in an aircraft.

13. The system of claim 12, wherein the aircraft is an unmanned aerial vehicle.

14. The system of claim 7, wherein the radar system is configured for maritime vessel detection.

15. One or more computer-readable media storing computer executable instructions that, when executed by one or more processors, perform acts comprising:
    receiving return signals from a radar transmission, the return signals including information on multiple range intervals within a pulse repetition interval (PRI);
    dechirping the return signals using multiple dechirp reference signals;
    digitizing the dechirped return signals; and
    associating the digitized signals for each range interval using a block of pulse returns for at least one of a detection process or an ISAR imaging process.

16. The one or more computer-readable media of claim 15, wherein dechirping the return signals includes dechirping overlapping signals using a first dechirp signal from a first dechirp generator and a second dechirp signal from a second dechirp generator.

17. The one or more computer-readable media of claim 15, further comprising aggregating the digitized dechirped return signals for each target to create an ISAR image of the target.

18. The one or more computer-readable media of claim 15, wherein the ISAR images are classified by comparison to at least one of a preconfigured database, a real-time database of objects imaged during a mission, or data received from off board sources.

19. The one or more computer-readable media of claim 15, wherein the acts are performed by a radar system configured in an aircraft.

20. The one or more computer-readable media of claim 15, wherein the acts are performed by an immobile station.

* * * * *